(12) United States Patent
Fader et al.

(10) Patent No.: US 11,399,084 B2
(45) Date of Patent: Jul. 26, 2022

(54) HOT PLUGGING OF SENSOR

(71) Applicant: NXP USA, Inc., Austin, TX (US)

(72) Inventors: Joachim Fader, Vaterstetten (DE);
Naveen Kumar Jain, Panipat (IN);
Shreya Singh, Ranchi (IN); Thomas John Rodriguez, Dripping Springs, TX (US); Shivali Jain, Narwana (IN)

(73) Assignee: NXP USA, Inc., Austin, TX (US)

( * ) Notice: Subject to any disclaimer, the term of this patent is extended or adjusted under 35 U.S.C. 154(b) by 137 days.

(21) Appl. No.: 15/930,102

(22) Filed: May 12, 2020

(65) Prior Publication Data
US 2021/0360090 A1 Nov. 18, 2021

(51) Int. Cl.
*H04L 12/28* (2006.01)
*H04L 69/18* (2022.01)
*G06F 9/445* (2018.01)

(52) U.S. Cl.
CPC .......... *H04L 69/18* (2013.01); *G06F 9/44505* (2013.01)

(58) Field of Classification Search
CPC ......... H04L 69/18; H04L 29/06; H04L 49/90; H04L 47/10; H04L 49/30; H04L 45/00; G06F 9/44505
See application file for complete search history.

(56) References Cited

U.S. PATENT DOCUMENTS

| | | | | |
|---|---|---|---|---|
| 10,980,061 | B2 * | 4/2021 | Sugaya | H04W 72/0446 |
| 2002/0144043 | A1 * | 10/2002 | Bennett | G06F 13/385 |
| | | | | 710/302 |
| 2016/0203099 | A1 * | 7/2016 | Kim | G06F 13/4068 |
| | | | | 710/105 |
| 2017/0118038 | A1 * | 4/2017 | Ujiie | H04B 1/3822 |
| 2018/0101392 | A1 | 4/2018 | Chew et al. | |
| 2019/0250611 | A1 * | 8/2019 | Costin | B60R 16/0231 |
| 2019/0258251 | A1 * | 8/2019 | Ditty | G06K 9/00805 |
| 2020/0334166 | A1 * | 10/2020 | Byun | G06F 12/0246 |
| 2021/0064293 | A1 * | 3/2021 | Cho | G06F 3/0604 |

(Continued)

FOREIGN PATENT DOCUMENTS

WO   WO 2018/071192   4/2018

OTHER PUBLICATIONS

NXP Semiconductors, MIPI-CSI2 Peripheral on i.MX6 MPUs, AN5305, Jul. 2016, pp. 1-31. (Year: 2016).*

(Continued)

*Primary Examiner* — Phuongchau Ba Nguyen

(57) ABSTRACT

A MIPI CSI-2/D-PHY receiving device is configured to handle being hot plugged to MIPI CSI-2/D-PHY transmitting device. During a hot plugging event, the MIPI CSI-2/D-PHY receiving device has not been initialized by receipt from the MIPI CSI-2/D-PHY transmitting device of a Stop State signal of duration $T_{INIT}$. Though the MIPI CSI-2/D-PHY transmitting device is already transmitting data associated with a partial frame, the MIPI CSI-2/D-PHY receiving device will not enter into an error or unknown state, and will ignore line start/end and frame end events and drop the data packets associated with the partial frame until a frame start event corresponding to a full frame is received from the MIPI CSI-2/D-PHY transmitting device.

20 Claims, 3 Drawing Sheets

(56) References Cited

U.S. PATENT DOCUMENTS

2021/0096760 A1* 4/2021 Cho ..................... G06F 3/0673
2021/0334034 A1* 10/2021 Ryu ..................... G06F 3/0679

OTHER PUBLICATIONS

XILINX, MIPI D-PHY v4.2, LogiCore IP Product Guide, Vivado Designe Suite, PG202, v4.2, Sep. 7, 2020, pp. 1-94. (Year: 2020).*
"All you need to know about MIPI D'PHY RX," EDN, copyright AspenCore, Inc., downloaded on the Internet from https://www.edn.com/all-you-need-to-know-about-mipi-dphy-rx/ on Feb. 5, 2020, 8 pages.

\* cited by examiner

HOT PLUGGING OF SENSOR

TECHNICAL FIELD

The present disclosure relates in general to communications between a transmitting device and a receiving device using the MIPI CSI-2 protocol with a D-PHY interface and, in particular, to hot plugging of such a transmitting device to the receiving device.

BACKGROUND

The MIPI (Mobile Industry Processor Interface) CSI-2 protocol has become ubiquitous in several industries, including the automotive industry where it has been widely adopted as an interface for cameras, and increasingly for radar and LIDAR sensor sub-systems. The CSI-2 protocol supports image sensors around the entire vehicle, including at the front for detecting pedestrians and other vehicles and on the sides for alerting drivers when they are drifting out of their lanes. For automatic emergency braking or adaptive cruise control, there may be more cameras in the front of the car. It is important that the interfaces between the sensors and the microcontrollers that operate these applications are robust.

The *Specification for Camera Serial Interface 2 (CSI-2)*, Version 1.3, MIPI Alliance, Inc., May 29, 2014 (herein referred to as the "MIPI CSI-2 Specification"), which is hereby incorporated by reference herein, defines standard data transmission and control interfaces between a transmitting device (e.g., a peripheral device) and a receiving device (e.g., a host device, such as a processor or microcontroller running an application engine). MIPI D-PHY is a physical serial data communication layer interface developed by MIP on which protocols run such as CSI-2 for transmission between a transmitting device and receiving device. The MIPI D-PHY physical layer is defined in the *MIPI Alliance Specification for D PHY*, Version 1.2, MIPI Alliance, Inc., Sep. 10, 2014 (herein referred to as the "MIPI D-PHY Specification"), which is hereby incorporated by reference herein.

The D-PHY physical layer for a CSI-2 implementation is composed of a configurable number of one or more unidirectional 2-wire data Lanes and a 2-wire clock Lane. A Lane is composed of a pair of transmission lines. All CSI-2 transmitters and receivers implementing the D-PHY physical layer shall support continuous clock behavior on the clock Lane, and optionally may support non-continuous clock behavior. For continuous clock behavior, the clock Lane remains in high-speed mode, generating active clock signals between the transmission of data packets. For non-continuous clock behavior, the clock Lane enters a LP-11 state between the transmission of data packets. The D-PHY physical layer includes both high speed and low power modules, which helps in achieving power efficiency. The payload data uses the high-speed modules, whereas the control and status information are sent with the help of low power modules. Depending on the number of data Lanes to be used for data transmission, the data is organized into packets by the transmitter. The transmitter then serializes the data on each Lane and transmits it to the corresponding receiver. Similarly, on the receiving side, the serial data from each data Lane is converted into byte format with the help of a deserializer present in each receiving Lane of the D-PHY. After this, the deserialized bytes from each Lane are merged together by the CSI-2 receiver.

The MIPI D-PHY Specification requires that as part of the initialization of the D-PHY interface in the receiving device for receipt of the data (e.g., after power-up), the D-PHY interface in the receiving device shall be initialized when the D-PHY interface in the transmitting device drives a Stop State (LP-11) on all of the configured data Lanes for a period longer then $T_{INIT}$, which is defined to be 100 microseconds. This first Stop State longer than the specified $T_{INIT}$ is referred to as the Initialization Period. The D-PHY interface in the receiving device is designed to ignore all states on the data and clock Lanes prior to the Initialization Period. Since the time period $T_{INIT}$ is considered a MIPI protocol-dependent parameter, if the D-PHY interface in the receiving device does not first observe the Stop State for a period longer than $T_{INIT}$, the CSI-2 receiver may then enter into an error state (and/or may attempt to reinitialize the link with the transmitting device). Conversely, upon successful reception of the Stop State for a period longer than $T_{INIT}$, the DPHY interface in the receiving device will start receiving the high-speed differential data from the D-PHY interface in the transmitting device.

In accordance with the MIPI CSI-2 Specification, there is typically a dedicated Camera Control Interface ("CCI") implemented between the transmitting device and the receiving device. CCI is a two-wire, bi-directional, half duplex, serial interface for configuring and controlling the transmitting device by the receiving device. CCI uses a protocol that is compatible with (e.g., a subset of) the Inter-Integrated Circuit ("I$^2$C") protocol. It is through the CCI that the receiving device configures the transmitting device, including its D-PHY interface to first transmit the Stop State for the specified Initialization Period.

A problem with devices communicating in accordance with the MIPI CSI-2 protocol over a MIPI D-PHY interface is that there is no existing protocol or configuration that permits hot plugging of the transmitting and receiving devices to each other. There are applications where hot plugging of a transmitting device to a receiving device is required or would be useful based on the overall product constraints of the application. For example, a customer implementing an integrated circuit incorporating the receiving device into their application may not want to include a mechanism by which to configure/sequence the transmitting device with the receiving device; or in the application, the receiving device may be designed to be configured by a separate device. Or, in a particular application, an integrated circuit incorporating the transmitting device may not possess an I$^2$C interface or extra pins to configure the transmitting device. In an automotive example, a situation may occur (e.g., a power glitch) in which the receiving device transitions into a reset state, and the application requires that the receiving device be able to begin processing the data from the transmitting device (e.g., a camera, radar, or LIDAR) without incurring the additional time needed for a full reset and synchronization between the two devices.

Therefore, since the MIPI D-PHY interface expects the previously described well-defined initialization sequence to occur as a result of use of the CCI to configure the transmitting device in accordance with the MIPI CSI-2 Specification, if there is no such implemented CCI or the transmitting device is configured apart from the receiving device, when the two devices are hot plugged, it is possible that the Stop State longer than the specified Initialization Period has already been transmitted by the transmitting device before the receiving device is initialized or otherwise prepared to observe it on the data lane(s). As a result, hot plugging of MIPI CSI-2/D-PHY devices cannot be supported by default.

DETAILED DESCRIPTION

Embodiments of the present disclosure enable a MIPI CSI-2/D-PHY transmitting device to be hot plugged to a MIPI CSI-2/D-PHY receiving device. During a hot plugging event, the MIPI CSI-2/D-PHY transmitting device may be already transmitting data associated with a partial frame, but the MIPI CSI-2/D-PHY receiving device is able to handle the data and protocol packets associated with the received partial frame without waiting for receipt from the MIPI CSI-2/D-PHY transmitting device of a Stop State signal of duration $T_{INIT}$. The MIPI CSI-2/D-PHY receiving device will not enter into an error or unknown state, but will instead proceed by ignoring line start/end and frame end events and dropping the data packets associated with the partial frame until a frame start event is received.

As defined herein, a "MIPI CSI-2/D-PHY transmitting device" is any device that is configured to format and transmit data in accordance with the MIPI CSI-2 Specification and the MIPI D-PHY Specification, as modified in accordance with embodiments of the present disclosure.

As defined herein, a "MIPI CSI-2/D-PHY receiving device" is any device that is configured to receive and process data in accordance with the MIPI CSI-2 Specification and the MIPI D-PHY Specification, as modified in accordance with embodiments of the present disclosure.

As such, a system that includes a MIPI CSI-2/D-PHY transmitting device in communication with a MIPI CSI-2/D-PHY receiving device is one in which the two devices communicate with each other in accordance with the MIPI CSI-2 Specification and the MIPI D-PHY Specification, as modified in accordance with embodiments of the present disclosure.

Figure 1:
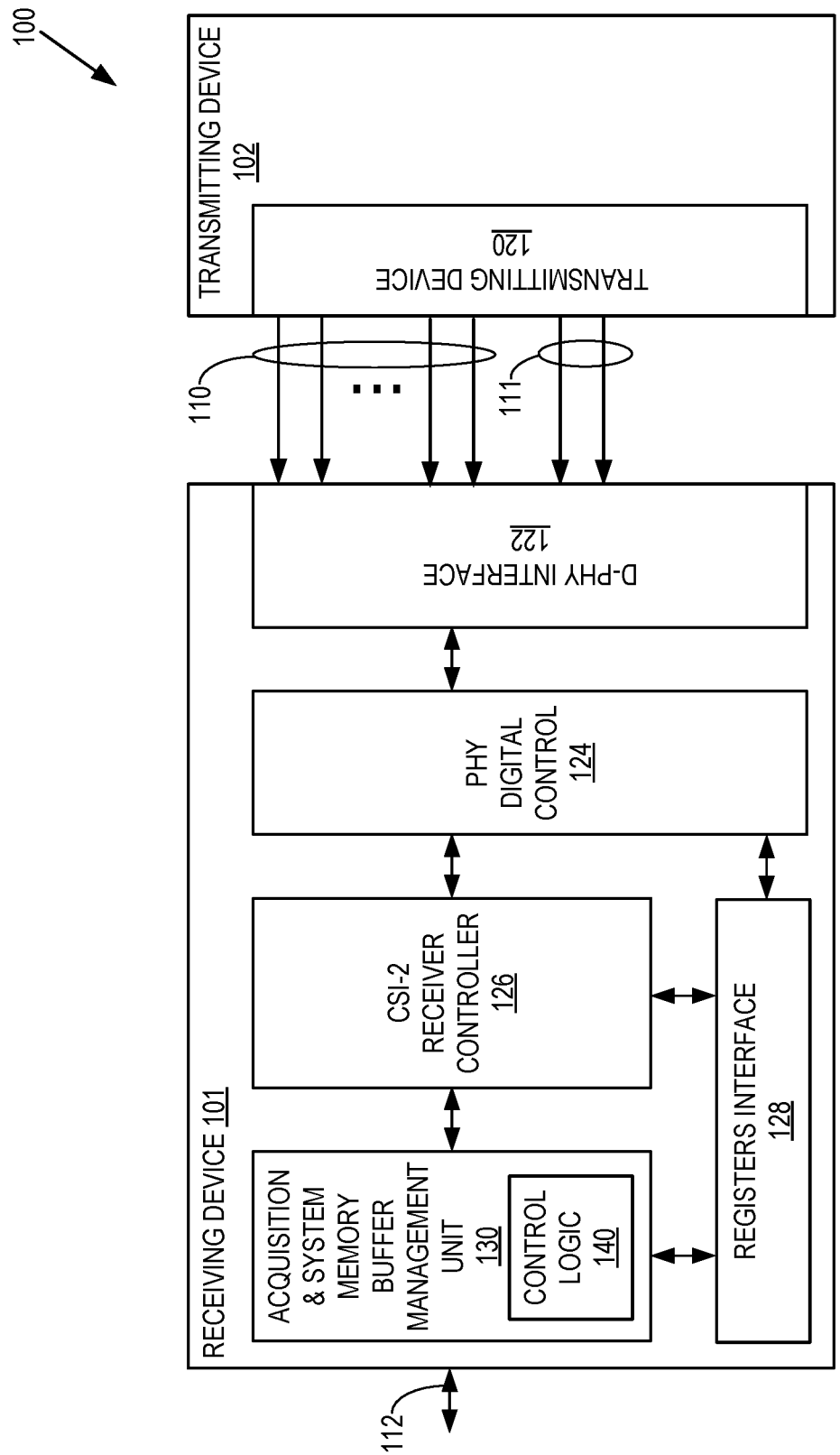
FIG. 1 illustrates a block diagram configured in accordance with embodiments of the present disclosure.

FIG. 1 illustrates a block diagram of a system 100 in which a MIPI CSI-2/D-PHY transmitting device 102 has been hot plugged to a MIPI CSI-2/D-PHY receiving device 101. The MIPI CSI-2/D-PHY receiving device 101 may be part of an integrated circuit implementing a host system, microcontroller unit ("MCU"), or system on an integrated circuit ("SoC") that implements a data acquisition system, application software, image processing unit, or any other applicable application engine (not shown) for receiving and processing data (e.g., higher level decoding and interpretation) from the MIPI CSI-2/D-PHY transmitting device 102. The MIPI CSI-2/D-PHY transmitting device 102 may be a digital camera, radar sensor, LIDAR sensor, or a deserializer device utilized for assisting with the transmission of captured data received from a serializer coupled to a digital camera, radar sensor, or LIDAR sensor. Though embodiments of the present disclosure are described herein with respect to the transmission of frames of data between the MIPI CSI-2/D-PHY transmitting device 102 and the MIPI CSI-2/D-PHY receiving device 101 where a full frame is transmitted beginning with a frame start packet and ends with a frame end packet, such a frame also refers to any time slice of user-defined byte-based information (e.g., payload independent data transported using short and long packet formats) bound by a start packet and an end packet (such as associated with information captured from a radar or LIDAR sensor). For the sake of simplicity, with respect to the MIPI CSI-2/D-PHY transmitting device 102, the components, signaling, and functionality associated with how it captures and processes data are not described, but are well-known in the art. The MIPI CSI-2/D-PHY transmitting device 102 utilizes a CSI-2/D-PHY transmitter 120 for sending data to the MIPI CSI-2/D-PHY receiving device 101 via one or more data Lanes 110 and a clock Lane 111 in a manner well-known in the art. A Lane is composed of a pair of transmission lines.

The MIPI CSI-2/D-PHY receiving device 101 includes a MIPI D-PHY interface 122 for receiving data via the data Lanes 110 and the clock Lane 111. A CSI-2 receiver controller 126 implements protocol functions in accordance with the MIPI CSI-2 Specification to configure and control the receiving of various data and protocol packets by the D-PHY interface 122 through an implementation of a PI-TY digital control 124. The CSI-2 receiver controller 126 further operates to parse and process the received data and protocol packets for passing the data to the acquisition and system memory buffer management unit 130, which operates to process (e.g., byte to pixel transformation) and store the data (e.g., for subsequent processing by a data acquisition system, application software, image processing unit, or any other applicable application engine, and/or for subsequent transmission over the communication link 112). The registers interface 128 operates as an input/output interface between configuration and status registers (not shown) within the MIPI CSI-2/D-PHY receiving device 101 and other devices within the integrated circuit, such as a processor running a data acquisition system, application software, image processing unit, or other application engine so that these other devices can configure, control, and/or monitor status/events inside the MIPI CSI-2/D-PHY receiving device 101. For example, the registers interface 128 may be used to read the status of received packet counters, the Stop State, received frames/data, frame timing events, etc. Similarly, the registers interface 128 may be used to configure the number of data Lanes, buffer configurations, and interrupt enables. For the sake of simplicity, the remaining components, signaling, and functionality associated with the MIPI CSI-2/D-PHY receiving device 101 are not described, but are well-known in the art.

As previously described, in a typical configuration whereby a transmitting device is communicating data to a receiving device in accordance with the MIPI CSI-2 Specification, a CCI interface between the devices enables the MIPI CSI-2/D-PHY receiving device 101 to control and configure the MIPI CSI-2/D-PHY transmitting device 102 so that the two devices are initialized in a coordinated manner, which includes ensuring that the CSI-2/D-PHY transmitter 120 first sends the Stop State (LP-11) on all of the configured data Lane(s) 110 for a period longer than $T_{INIT}$, which is defined to be 100 microseconds. This first Stop State longer than the specified $T_{INIT}$ is referred to as the Initialization Period. As previously described, the D-PHY interface 122 needs to see this Stop State for the Initialization Period on the data Lanes in order to be initialized for subsequent receipt of packets.

The receipt by the MIPI CSI-2/D-PHY receiving device 101 of this Stop State for the Initialization Period ensures there is clean interface in the system for the receipt of subsequent frames so that the acquisition and system memory buffer management unit 130 only receives and processes full frames with all of the proper data and timing events. It is important for the MIPI CSI-2/D-PHY receiving device 101 to only transfer full frames to a data acquisition system, application software, or other application engines within the integrated circuit for further processing. During a hot plugging event, the first partial frame could be composed of any portion of a full frame, and algorithms within these data acquisition systems, application software, image processing unit, or other application engines are typically designed to operate on full frames. Dropping (e.g., discarding or not otherwise writing the partial frame data in the system memory buffers) and not passing the corresponding events ensures that the data acquisition system, application software, or other application engines can properly process the subsequently received full frames in a coherent manner. Otherwise, forwarding partial frame data, which will necessarily not include a frame start packet, may result in errors and/or unwanted events occurring within the data acquisition system, application software, image processing unit, or other application engines. Avoiding these types of situations is why the MIPI D-PHY Specification requires that the D-PHY interface 122 in the MIPI CSI-2/D-PHY receiving device 101 be initialized with the Stop State for a period longer then $T_{INIT}$, since this precedes the transmission of a full frame by the MIPI CSI-2/D-PHY transmitting device 102.

As shown in FIG. 1, the MIPI CSI-2/D-PHY receiving device 101 and the MIPI CSI-2/D-PHY transmitting device 102 may be coupled to each other without utilizing such a CCI interface. Therefore, in such a situation, it is not possible for the MIPI CSI-2/D-PHY receiving device 101 to configure the MIPI CSI-2/D-PHY transmitting device 102 for initiating the transmission of data from the MIPI CSI-2/D-PHY transmitting device 102 to the MIPI CSI-2/D-PHY receiving device 101, which includes sending the Stop State for the Initialization Period.

In accordance with embodiments of the present disclosure, hot plugging of a MIPI CSI-2/D-PHY transmitting device 102 to an MIPI CSI-2/D-PHY receiving device 101 may involve any situation where there is no ability for the MIPI CSI-2/D-PHY receiving device 101 to configure the MIPI CSI-2/D-PHY transmitting device 102 for transmission of data from the MIPI CSI-2/D-PHY transmitting device 102 to the MIPI CSI-2/D-PHY receiving device 101 (such as through a CCI interface) by which the D-PHY interface 122 is properly configured to first observe the Stop State on the data Lane(s) 110 for a period longer than $T_{INIT}$ (i.e., the Initialization Period).

The following are exemplary non-limiting situations of hot plugging of the MIPI CSI-2/D-PHY transmitting device 102 with the MIPI CSI-2/D-PHY receiving device 101 (also referred to herein as "hot plugging events"):

The MIPI CSI-2/D-PHY transmitting device 102 is a deserializer controlled by another processor or microcontroller, which independently resets the deserializer, and there is no CCI interface between the deserializer and the MIPI CSI-2/D-PHY receiving device 101;

The MIPI CSI-2/D-PHY transmitting device 102 enters into a reset state (e.g., a power up state from a power down state), and there is no CCI interface between the MIPI CSI-2/D-PHY transmitting device 102 and the MIPI CSI-2/D-PHY receiving device 101;

Any situation in which the MIPI CSI-2/D-PHY transmitting device 102 is activated asynchronously to activation of the MIPI CSI-2/D-PHY receiving device 101;

A connection of the MIPI CSI-2/D-PHY transmitting device 102 to the MIPI CSI-2/D-PHY receiving device 101 in which the MIPI CSI-2/D-PHY transmitting device 102 has already begun transmitting data on the data Lane(s) 110 before the connection;

Where the MIPI CSI-2/D-PHY receiving device 101 enters into a reset state for various reasons (e.g., to handle errors), and in such a situation, the MIPI CSI-2/D-PHY transmitting device 102 is still in operation, which results in the MIPI CSI-2/D-PHY receiving device 101 receiving data packets during any point within a received frame (also referred to herein as a partial frame) from the MIPI CSI-2/D-PHY transmitting device 102.

With one or more of the foregoing exemplary situations of hot plugging of the MIPI CSI-2/D-PHY transmitting device 102 with the MIPI CSI-2/D-PHY receiving device 101, the MIPI CSI-2/D-PHY transmitting device 102 may be actively sending data over the data Lane(s) 110 before the MIPI CSI-2/D-PHY receiving device 101 is properly configured for receiving and processing such data. As previously described, the MIPI D-PHY Specification requires that the MIPI CSI-2/D-PHY receiving device 101 observes the Stop State on the data Lane(s) 110 a period longer than $T_{INIT}$ in order that the MIPI CSI-2/D-PHY receiving device 101 is configured for receiving and processing data from the MIPI CSI-2/D-PHY transmitting device 102. If such a Stop State for a period as long as the $T_{INIT}$ is not observed on the data Lane(s) 110, the MIPI CSI-2/D-PHY receiving device 101 may not be properly initialized to receive packets (e.g., the D-PHY interface 122 is not initialized, and the MIPI CSI-2/D-PHY receiving device 101 will interpret this as an error and may try to reinitialize). As will be described with respect to FIG. 2, embodiments of the present disclosure implement control logic 140 that enables the MIPI CSI-2/D-PHY receiving device 101 to process data received from the MIPI CSI-2/D-PHY transmitting device 102 during situations when the MIPI CSI-2/D-PHY transmitting device 102 is hot plugged with the MIPI CSI-2/D-PHY receiving device 101.

Figure 2:
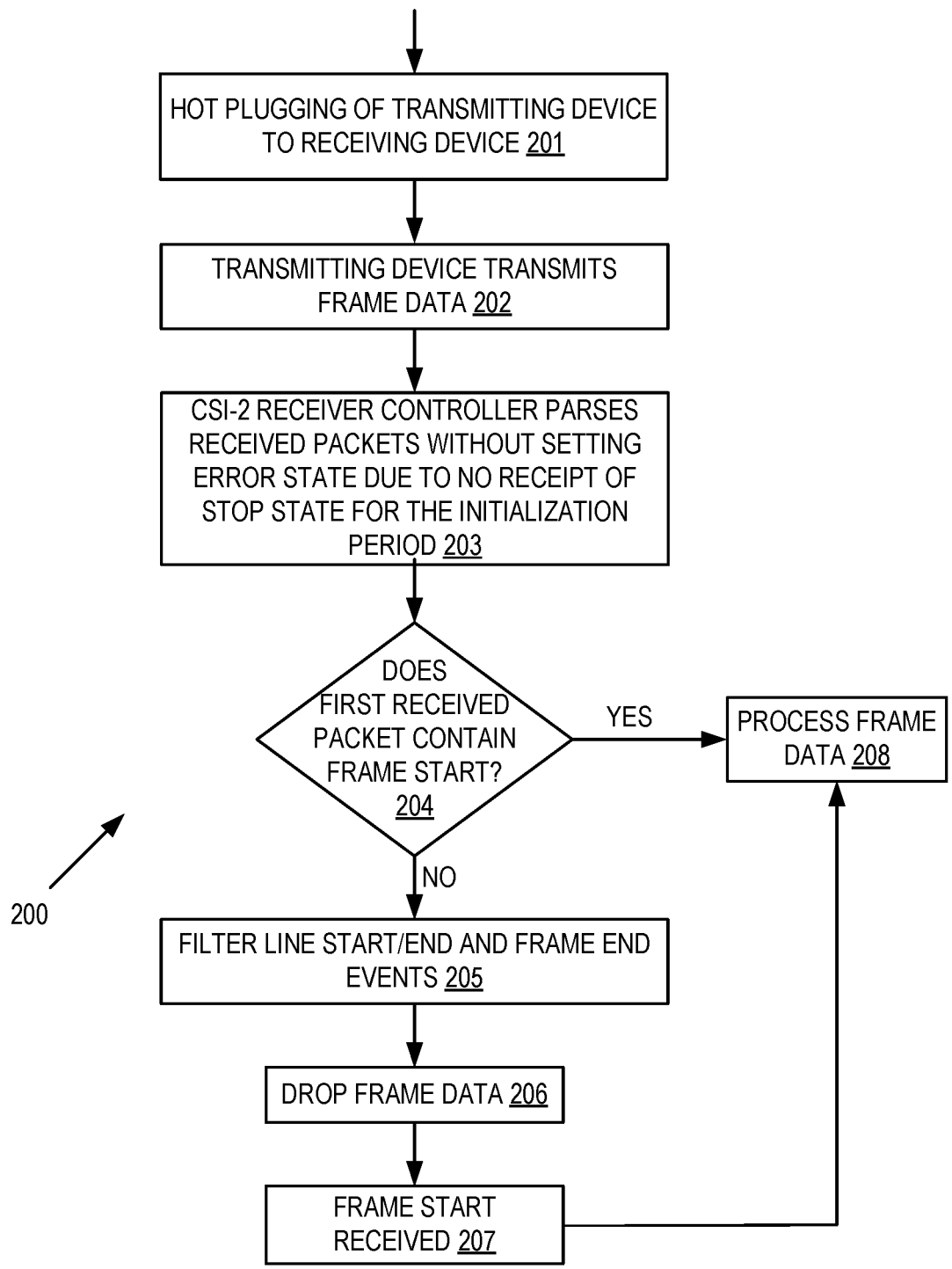
FIG. 2 illustrates a flow chart diagram configured in accordance with embodiments of the present disclosure.

FIG. 2 illustrates a flow chart diagram of a process 200 configured in accordance with embodiments of the present disclosure. The operations conducted within the process blocks 203-208 may be implemented within control logic 140, which may be implemented within the acquisition and system memory buffer management unit 130. One or more of the process blocks 203-208 may be configured as hardware, firmware, resident software, micro-code, or any combination thereof.

The process block 201 represents any one of the situations described herein in which the MIPI CSI-2/D-PHY transmitting device 102 is hot plugged with the MIPI CSI-2/D-PHY receiving device 101. In accordance with embodiments of the present disclosure, the MIPI CSI-2/D-PHY transmitting device 102 may be configured to operate in a non-continuous clock mode. In such a situation, even though the Stop State for a period $T_{INIT}$ was not received (even on the clock Lane 111), since the shorter stop states will be transmitted by the MIPI CSI-2/D-PHY transmitting device 102 in a non-continuous mode to accompany every transmitted packet (i.e., the stop states that are shorter in duration than the period $T_{INIT}$), the D-PHY interface 122 will be able to utilize these to continue receiving the data packets. In a continuous clock mode, the only stop state transmitted by the MIPI CSI-2/D-PHY transmitting device 102 is the Stop State for a period $T_{INIT}$.

The process block 202 represents the MIPI CSI-2/D-PHY transmitting device 102 transmitting packets over the data Lane(s) 110 to the MIPI CSI-2/D-PHY receiving device 101. In the process block 203, the CSI-2 receiver controller 126 begins parsing the received packets despite the fact that the D-PHY interface 122 did not receive the Stop State for a period $T_{INIT}$ on the data Lane(s) 110 (and thus, the MIPI CSI-2/D-PHY receiving device 101 does not enter into an error or unknown state and/or attempt to re-initialize).

In the process block 204, the control logic 140 may determine whether the first data packet received by the D-PHY interface 122 contains a frame start packet. If so, then the control logic 140 will instruct the CSI-2 receiver controller 126 to begin processing the frame data. Such a situation may occur when the first data packet that is received after the hot plugging of the MIPI CSI-2/D-PHY transmitting device 102 with the MIPI CSI-2/D-PHY receiving device 101 contains a frame start packet. Note that the process block 204 may be optionally implemented within embodiments of the present disclosure.

However, in situations in which there is a hot plugging of the MIPI CSI-2/D-PHY transmitting device 102 with the MIPI CSI-2/D-PHY receiving device 101, and the first received packet is not a frame start packet, but instead includes other types of packets most commonly contained within a stream of data that is somewhere within the middle of a frame (i.e., partial frame data), the process 200 proceeds to the process block 205 whereby the CSI-2 receiver controller 126 is instructed by the control logic 140 to filter (ignore or discard) line start/end and frame end events (so that such timing/protocol information is not passed to the acquisition and system memory buffer management unit 130).

In the process block 206, the control logic 140 instructs the CSI-2 receiver controller 126 to drop the frame data as a result of the fact that it was not preceded by the receipt of a frame start packet. Since such frame data contains data packets pertaining to a partial frame, this frame data is not forwarded to the acquisition and system memory buffer management unit 130 for processing and storing such partial frame data. This ensures that a clean interface is maintained with the software and memory buffers. As a result, there will not be any interrupts pertaining to the partially received frames, and the partial frame data will not be written to the memory buffers. As previously described, this is important since it ensures that the acquisition and system memory buffer management unit 130 only receives entire full frames and associated timing events.

The process blocks 205-206 enable the control logic 140 to be robust so that the MIPI CSI-2/D-PHY receiving device 101 can receive and handle packets pertaining to a partially received frame beginning from any point in the 360 degree cycle of a full frame, and maintain a clean interface with the software and memory buffers in the acquisition and system memory buffer management unit 130 so that they do not contain any frame data and/or associated timing/protocol information when a subsequent full frame is received.

The following example describes how a partial frame is handled in accordance with embodiments of the present disclosure. Assume an exemplary video frame contains 1080 lines in a full frame. The MIPI CSI-2/D-PHY transmitting device 102 (e.g., a camera) may be designed to capture video images on a frame-by-frame basis, and transmit each full frame in succession, with each frame containing 1080 lines. In a normal situation in which the MIPI CSI-2/D-PHY transmitting device 102 has not been hot plugged with the MIPI CSI-2/D-PHY receiving device 101, when the frame start packet is properly received, the CSI-2 receiver controller 126 will send a corresponding frame start interrupt to the acquisition and system memory buffer management unit 130 so that it properly writes all of the 1080 lines into the system memory buffers. The CSI-2 receiver controller 126 will also be able to properly generate events to other processing units in the MIPI CSI-2/D-PHY receiving device 101. Additionally, when the frame end packet is received after all of the 1080 lines, the CSI-2 receiver controller 126 generates a frame end interrupt to send to the acquisition and system memory buffer management unit 130. These frame start and end interrupts are important for enabling the acquisition and system memory buffer management unit 130 to properly format and write the 1080 lines of the full frame into the system memory buffers.

However, during a hot plugging event, the packets initially received by the MIPI CSI-2/D-PHY receiving device 101 may pertain to any line within the frame, for example, packets pertaining to the $20^{th}$ line. As a result, when the CSI-2 receiver controller 126 initially receives the packets pertaining to the $20^{th}$ line of the frame, it will not generate the frame start interrupt since it had not received the frame start. Additionally, in accordance with the process blocks 205 and 206, the CSI-2 receiver controller 126 will ignore and drop all information pertaining to this partial frame, i.e., from the $20^{th}$ line to the $1080^{th}$ line, including not writing (i.e., dropping) the pixel data pertaining to these frame lines to system memory buffers, and ignoring all of the timing information associated with each of the frame lines (i.e., line start and line end events) and the frame end packet sent with the partial frame.

The operations performed in the process blocks 205 and 206 ensure there is clean interface in the system for the receipt of subsequent frames so that the acquisition and system memory buffer management unit 130 only receives and processes full frames with all of the proper data and timing events, the importance of which has been previously described herein.

Eventually, the MIPI CSI-2/D-PHY transmitting device 102 will begin sending the next frame, which will begin with a frame start packet. In the process block 207, when this frame start packet is received, the control logic 140 will then instruct the CSI-2 receiver controller 126 to begin processing the frame data in the process block 208, which will then be passed to the acquisition and system memory buffer management unit 130. In accordance with certain embodiments of the present disclosure, even in a situation where the frame start packet is corrupted for some reason, the control logic 140 may be configured so that the CSI-2 receiver controller 126 can begin processing the frame data in the process block 208 since it had received the frame end packet pertaining to the partial frame in the process block 205.

As can be seen from the foregoing, embodiments of the present disclosure enable the MIPI CSI-2/D-PHY receiving device 101 to recover to a predictable state despite an occurrence of the hot plugging event.

In accordance with embodiments of the present disclosure, a packet counter may be implemented (e.g., in the CSI-2 receiver controller 126 or the acquisition and system memory buffer management unit 130) in order to count incoming frames, number of packets, and/or number of lines received in each frame. A data acquisition system, application software, or other application engines may utilize these statistics (e.g., via the registers interface 128) after an occurrence of a hot plugging event to ensure that the MIPI CSI-2/D-PHY receiving device 101 is fully active and satisfactorily receiving full frames.

Figure 3:
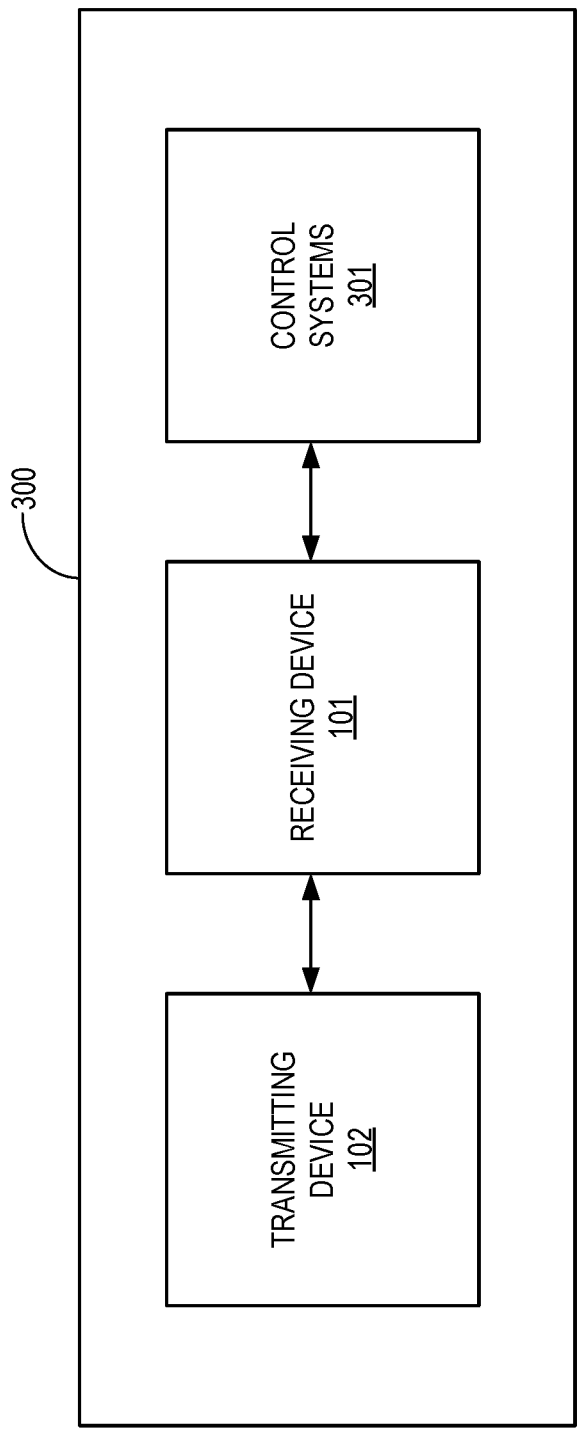
FIG. 3 illustrates a simplified block diagram of exemplary applications of embodiments of the present disclosure.

FIG. 3 illustrates a simplified block diagram of an application 300 in which embodiments of the present disclosure are implemented. The application 300 may be any device or apparatus in which a MIPI CSI-2/D-PHY transmitting device 102 communicates with a MIPI CSI-2/D-PHY receiving device 101. A non-limiting example of an application 300 is an automotive vehicle that implements one or more MIPI CSI-2/D-PHY transmitting devices 102 as a camera, radar sensor, LIDAR sensor, and/or deserializer. In accordance with embodiments of the present disclosure, a situation has occurred in which the MIPI CSI-2/D-PHY transmitting device 102 has been hot plugged with the MIPI CSI-2/D-PHY receiving device 101 as previously described. The MIPI CSI-2/D-PHY receiving device 101 may be in communication with one or more various other control systems 301 (e.g., advanced driver assist systems), which utilize the data processed by the MIPI CSI-2/D-PHY receiving device 101 to perform various functions that make use of the data provided by the MIPI CSI-2/D-PHY transmitting device 102.

Embodiments of the present disclosure provide a method including hot plugging a MIPI CSI-2/D-PHY transmitting device to a MIPI CSI-2/D-PHY receiving device, wherein the MIPI CSI-2/D-PHY transmitting device is sending data packets over one or more data Lanes coupled between the MIPI CSI-2/D-PHY transmitting device and the MIPI CSI-2/D-PHY receiving device; and processing of the data packets by the MIPI CSI-2/D-PHY receiving device. The processing may be commenced without configuration of the MIPI CSI-2/D-PHY transmitting device by the MIPI CSI-2/D-PHY receiving device. The MIPI CSI-2/D-PHY transmitting device may be coupled to the MIPI CSI-2/D-PHY receiving device without a camera control interface. The MIPI CSI-2/D-PHY transmitting device may be coupled to the MIPI CSI-2/D-PHY receiving device by only the one or more data Lanes and a corresponding clock Lane. The processing may be commenced by the MIPI CSI-2/D-PHY receiving device without waiting for receipt from the MIPI CSI-2/D-PHY transmitting device of a Stop State signal of duration $T_{INIT}$ on the one or more data Lanes. The processing of the data by the MIPI CSI-2/D-PHY receiving device may include ignoring line start/end and frame end events and discarding the data packets until a frame start event is received, and/or forwarding data packets to system memory subsequent to receipt of the frame start event. The MIPI CSI-2/D-PHY transmitting device may be selected from a group consisting of a camera, radar sensor, LIDAR sensor, and deserializer, and wherein the MIPI CSI-2/D-PHY receiving device is implemented within a microcontroller configured to process the data packets received from the MIPI CSI-2/D-PHY transmitting device. The MIPI CSI-2/D-PHY transmitting device may be sending the data packets over the one or more data Lanes at an instant the MIPI CSI-2/D-PHY transmitting device is hot plugged to the MIPI CSI-2/D-PHY receiving device, wherein the data packets are associated with a partial frame.

Embodiments of the present disclosure provide an integrated circuit that includes a MIPI CSI-2/D-PHY receiving device that includes a D-PHY interface configured to receive data via one or more data Lanes and a clock Lane, a CSI-2 receiver controller suitable to configure and control receiving of the data and protocol packets by the D-PHY interface for subsequent processing by the MIPI CSI-2/D-PHY receiving device, and control logic configured to enable the CSI-2 receiver controller to control the receiving of the data and protocol packets during a hot plugging of a MIPI CSI-2/D-PHY transmitting device to the MIPI CSI-2/D-PHY receiving device. The control logic may be configured to enable the CSI-2 receiver controller to control the receiving of the data and protocol packets without entering into an error state. The control logic may be configured to enable the CSI-2 receiver controller to control the receiving of the data and protocol packets without receipt of a Stop State for a period as long as $T_{INIT}$ by the D-PHY interface. The control logic may be configured to enable the CSI-2 receiver controller to drop the data packets and filter the protocol packets associated with a partial frame. The control logic may be configured to enable the CSI-2 receiver controller to forward data packets associated with a full frame to system memory buffers subsequent to receipt of the partial frame.

Embodiments of the present disclosure provide a system that includes a MIPI CSI-2/D-PHY transmitting device, and a MIPI CSI-2/D-PHY receiving device coupled to the MIPI CSI-2/D-PHY transmitting device via one or more data Lanes and a clock Lane, wherein the MIPI CSI-2/D-PHY receiving device is configured to handle a receipt of data packets and protocol packets corresponding to a partial frame from the MIPI CSI-2/D-PHY transmitting device before being initialized by receipt of a Stop State for a period as long as $T_{INIT}$. The MIPI CSI-2/D-PHY receiving device may be configured to drop the data packets and filter the protocol packets corresponding to the partial frame. The MIPI CSI-2/D-PHY receiving device may be configured to forward data packets associated with a full frame to system buffers subsequent to receipt of the partial frame. The MIPI CSI-2/D-PHY receiving device may be configured to forward data packets associated with a full frame to an acquisition and system memory buffer management unit for subsequent processing by an application engine when a frame start packet corresponding to the full frame is received after the partial frame, wherein the partial frame did not include a frame start packet. The partial frame may have been transmitted by the MIPI CSI-2/D-PHY transmitting device to the MIPI CSI-2/D-PHY receiving device as a consequence of a hot plugging of the MIPI CSI-2/D-PHY transmitting device to the MIPI CSI-2/D-PHY receiving device. The MIPI CSI-2/D-PHY receiving device may be implemented within an automotive microcontroller, and the MIPI CSI-2/D-PHY transmitting device may be a camera, a radar sensor, a LIDAR sensor, or a deserializer device.

A number of embodiments of the disclosure have been described. Nevertheless, it will be understood that various modifications may be made without departing from the spirit and scope of the present disclosure. Accordingly, other embodiments are within the scope of the following claims.

It will be appreciated that any components said to be coupled may be coupled or connected either directly or indirectly. In the case of indirect coupling, additional components may be located between the two components that are said to be coupled.

The singular forms "a," "an," and "the" include plural referents unless the context clearly dictates otherwise. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

To the extent not described herein, many details regarding specific materials, processing acts, circuits, and circuit elements are conventional, and may be found in textbooks and other sources within the computing, electronics, and software arts.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "circuitry," "unit," "module," "process block," or "system." Furthermore, aspects of the present disclosure may take the form of a computer program product embodied in one or more computer readable medium(s) having computer readable program code embodied thereon.

Aspects of the present disclosure are described herein with reference to a flowchart illustration (FIG. 2) and/or block diagrams (FIGS. 1 and 3) of methods, processes, process blocks, apparatus (systems), and computer program products according to embodiments of the disclosure. It will be understood that each block of the flowchart illustration and/or block diagrams, and combinations of blocks in the flowchart illustration and/or block diagrams, can be implemented by computer program instructions. These computer program instructions may be provided to a processor of a microcontroller, SoC, general purpose computer, special purpose computer, or other programmable data processing apparatus to produce a machine, such that the instructions, which execute via the processor, create means for implementing the functions/acts specified in the flowchart and/or block diagram block or blocks.

These computer program instructions may also be stored in a computer readable medium that can direct a microcontroller, SoC, computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a microcontroller, SoC, computer, other programmable data processing apparatus, or other devices to cause a series of operational steps to be performed on the microcontroller, SoC, computer, other programmable apparatus or other devices to produce a computer implemented process such that the instructions which execute on the microcontroller, SoC, computer or other programmable apparatus provide processes for implementing the functions/acts specified in the flowchart and/or block diagram block or blocks.

Various units, circuits, or other components (e.g., the control logic 140) may be described as "configured to" perform a task or tasks (e.g., the process blocks 203-208). In such contexts, "configured to" is a broad recitation of structure generally meaning "having circuitry that is capable of" performing the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke a 35 U.S.C. § 112, paragraph six interpretation for that unit/circuit/component.

What is claimed is:

1. A method comprising:
   hot plugging a Mobile Industry Processor Interface, Camera Serial Interface 2/physical data layer (MIPI CSI-2/D-PHY) transmitting device to a MIPI CSI-2/D-PHY receiving device, wherein the MIPI CSI-2/D-PHY transmitting device is sending data packets over one or more data Lanes coupled between the MIPI CSI-2/D-PHY transmitting device and the MIPI CSI-2/D-PHY receiving device; and
   processing of the data packets by the MIPI CSI-2/D-PHY receiving device, the processing of the data packets by the MIPI CSI-2/D-PHY receiving device including ignoring line start/end and frame end events and discarding the data packets until a frame start event is received.

2. The method as recited in claim 1, wherein the processing is commenced without configuration of the MIPI CSI-2/D-PHY transmitting device by the MIPI CSI-2/D-PHY receiving device.

3. The method has recited in claim 2, wherein the MIPI CSI-2/D-PHY transmitting device is coupled to the MIPI CSI-2/D-PHY receiving device without a camera control interface.

4. The method as recited in claim 2, wherein the MIPI CSI-2/D-PHY transmitting device is coupled to the MIPI CSI-2/D-PHY receiving device by only the one or more data Lanes and a corresponding clock Lane.

5. The method as recited in claim 1, wherein the processing is commenced by the MIPI CSI-2/D-PHY receiving device without waiting for receipt from the MIPI CSI-2/D-PHY transmitting device of a Stop State signal of duration $T_{INIT}$ on the one or more data Lanes.

6. The method as recited in claim 5, wherein the processing of the data by the MIPI CSI-2/D-PHY receiving device comprises:
   forwarding data packets to system memory subsequent to receipt of the frame start event.

7. The method as recited in claim 1, wherein the MIPI CSI-2/D-PHY transmitting device is selected from a group consisting of a camera, radar sensor, LIDAR sensor, and deserializer, and wherein the MIPI CSI-2/D-PHY receiving device is implemented within a microcontroller configured to process the data packets received from the MIPI CSI-2/D-PHY transmitting device.

8. The method as recited in claim 1, wherein the MIPI CSI-2/D-PHY transmitting device is sending the data packets over the one or more data Lanes at an instant the MIPI CSI-2/D-PHY transmitting device is hot plugged to the MIPI CSI-2/D-PHY receiving device, wherein the data packets are associated with a partial frame.

9. An integrated circuit comprising a Mobile Industry Processor Interface, Camera Serial Interface 2/physical data layer (MIPI CSI-2/D-PHY) receiving device comprising:
   a D-PHY interface configured to receive data via one or more data Lanes and a clock Lane;
   a CSI-2 receiver controller suitable to configure and control receiving of the data and protocol packets by the D-PHY interface for subsequent processing by the MIPI CSI-2/D-PHY receiving device; and
   control logic configured to enable the CSI-2 receiver controller to:
      control the receiving of the data and protocol packets during a hot plugging of a MIPI CSI-2/D-PHY transmitting device to the MIPI CSI-2/D-PHY receiving device;

control the receiving of the data and protocol packets without receipt of a Stop State for a period as long as an initialization time period ($T_{INIT}$) by the D-PHY interface; and drop the data packets and filter the protocol packets associated with a partial frame.

10. The integrated circuit as recited in claim 9, wherein the control logic is configured to enable the CSI-2 receiver controller to control the receiving of the data and protocol packets without entering into an error state.

11. The integrated circuit as recited in claim 9, wherein the control logic is configured to enable the CSI-2 receiver controller to forward data packets associated with a full frame to system memory buffers subsequent to receipt of the partial frame.

12. A system comprising:
a Mobile Industry Processor Interface, Camera Serial Interface 2/physical data layer (MIPI CSI-2/D-PHY) transmitting device; and
a MIPI CSI-2/D-PHY receiving device coupled to the MIPI CSI-2/D-PHY transmitting device via one or more data Lanes and a clock Lane, wherein the MIPI CSI-2/D-PHY receiving device is configured to handle a receipt of data packets and protocol packets corresponding to a partial frame from the MIPI CSI-2/D-PHY transmitting device before being initialized by receipt of a Stop State for a period as long as initialization time period ($T_{INIT}$), and wherein the MIPI CSI-2/D-PHY receiving device is configured to drop the data packets and filter the protocol packets corresponding to the partial frame.

13. The system as recited in claim 12, wherein the MIPI CSI-2/D-PHY receiving device is configured to forward data packets associated with a full frame to system buffers subsequent to receipt of the partial frame.

14. The system as recited in claim 12, wherein the MIPI CSI-2/D-PHY receiving device is configured to forward data packets associated with a full frame to an acquisition and system memory buffer management unit for subsequent processing by an application engine when a frame start packet corresponding to the full frame is received after the partial frame, wherein the partial frame did not include a frame start packet.

15. The system as recited in claim 12, wherein the partial frame was transmitted by the MIPI CSI-2/D-PHY transmitting device to the MIPI CSI-2/D-PHY receiving device as a consequence of a hot plugging of the MIPI CSI-2/D-PHY transmitting device to the MIPI CSI-2/D-PHY receiving device.

16. The system as recited in claim 12, wherein the MIPI CSI-2/D-PHY receiving device is implemented within an automotive microcontroller, and the MIPI CSI-2/D-PHY transmitting device is selected from a group consisting of a camera, a radar sensor, a LIDAR sensor, and a deserializer device.

17. A system comprising:
a Mobile Industry Processor Interface, Camera Serial Interface 2/physical data layer (MIPI CSI-2/D-PHY) transmitting device; and
a MIPI CSI-2/D-PHY receiving device coupled to the MIPI CSI-2/D-PHY transmitting device via one or more data Lanes and a clock Lane, wherein the MIPI CSI-2/D-PHY receiving device is configured to handle a receipt of data packets and protocol packets corresponding to a partial frame from the MIPI CSI-2/D-PHY transmitting device before being initialized by receipt of a Stop State for a period as long as initialization time period ($T_{INIT}$), and wherein the MIPI CSI-2/D-PHY receiving device is configured to forward data packets associated with a full frame to an acquisition and system memory buffer management unit for subsequent processing by an application engine when a frame start packet corresponding to the full frame is received after the partial frame, wherein the partial frame did not include a frame start packet.

18. The system as recited in claim 17, wherein the MIPI CSI-2/D-PHY receiving device is configured to forward data packets associated with a full frame to system buffers subsequent to receipt of the partial frame.

19. The system as recited in claim 17, wherein the partial frame was transmitted by the MIPI CSI-2/D-PHY transmitting device to the MIPI CSI-2/D-PHY receiving device as a consequence of a hot plugging of the MIPI CSI-2/D-PHY transmitting device to the MIPI CSI-2/D-PHY receiving device.

20. The system as recited in claim 17, wherein the MIPI CSI-2/D-PHY receiving device is implemented within an automotive microcontroller, and the MIPI CSI-2/D-PHY transmitting device is selected from a group consisting of a camera, a radar sensor, a LIDAR sensor, and a deserializer device.

* * * * *